United States Patent
Lamers et al.

(10) Patent No.: US 6,624,276 B2
(45) Date of Patent: *Sep. 23, 2003

(54) CURABLE POLYURETHANES, COATINGS PREPARED THEREFROM, AND METHOD OF MAKING THE SAME

(75) Inventors: Paul H. Lamers, Steinheim (DE); Jonathan T. Martz, Glenshaw, PA (US); Lawrence D. Meyers, Strongsville, OH (US); Carolyn A. Novak, Gibsonia, PA (US); Kurt G. Olson, Gibsonia, PA (US); James P. Rowley, Freeport, PA (US); Christopher A. Verardi, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/960,543

(22) Filed: Sep. 21, 2001

(65) Prior Publication Data

US 2002/0086115 A1 Jul. 4, 2002

Related U.S. Application Data

(60) Provisional application No. 60/234,514, filed on Sep. 22, 2000.

(51) Int. Cl.$^7$ .............................................. C08G 18/80
(52) U.S. Cl. .......................... 528/45; 528/71; 528/73; 524/591; 427/385.5; 428/423.1
(58) Field of Search ....................... 528/45, 73, 71; 524/591; 427/385.5; 428/423.1

(56) References Cited

U.S. PATENT DOCUMENTS

| | | | |
|---|---|---|---|
| 2,515,164 A | 7/1950 | Sargent | 260/47 |
| 2,551,421 A | 5/1951 | Copenhaver | 260/608 |
| 3,506,626 A | 4/1970 | Phillips et al. | 260/79 |
| 3,697,402 A | 10/1972 | Kehr et al. | 204/159.14 |
| 3,725,229 A | 4/1973 | Kehr et al. | 204/159.14 |
| 3,734,968 A | 5/1973 | Hickner et al. | 260/609 D |
| 3,859,360 A | 1/1975 | Oswald et al. | 260/609 D |
| 3,860,546 A | 1/1975 | Tsou | 260/29.2 TN |
| 4,016,122 A * | 4/1977 | Matsuda et al. | |
| 4,124,552 A | 11/1978 | Koleske et al. | 260/29.2 TN |
| 4,163,094 A | 7/1979 | Turpin | 528/45 |
| 4,268,426 A | 5/1981 | Williams et al. | 260/22 TN |
| 4,366,307 A | 12/1982 | Singh et al. | 528/373 |
| 4,489,135 A | 12/1984 | Drexler et al. | 428/423.1 |
| 4,558,090 A | 12/1985 | Drexler et al. | 524/591 |
| 4,609,762 A | 9/1986 | Morris et al. | 568/38 |
| 4,992,507 A | 2/1991 | Coogan et al. | 524/591 |
| 5,047,294 A | 9/1991 | Schwab et al. | 428/432.1 |
| 5,071,904 A | 12/1991 | Martin et al. | 524/458 |
| 5,227,422 A | 7/1993 | Mitsuji et al. | 524/457 |
| 5,296,529 A * | 3/1994 | Yukawa et al. | |
| 5,328,579 A | 7/1994 | Kasukawa et al. | 204/181.1 |
| 5,508,340 A | 4/1996 | Hart | 524/591 |
| 5,516,455 A | 5/1996 | Jacobine et al. | 252/299.01 |
| 5,541,251 A | 7/1996 | Bontinck et al. | 524/507 |
| 5,905,132 A | 5/1999 | Wegner et al. | 528/45 |
| 6,077,960 A | 6/2000 | Ling et al. | 548/951 |

FOREIGN PATENT DOCUMENTS

| | | |
|---|---|---|
| DE | 3 436 571 | 6/1985 |
| DE | 198 49 207 A1 | 4/2000 |
| EP | 448 148 | 9/1991 |
| EP | 0 959 085 A1 | 11/1999 |
| GB | 1 575 637 | 9/1980 |
| WO | WO 99/61532 | 12/1999 |

OTHER PUBLICATIONS

G.K. Musorin et al., "A Simple Synthesis of 2–Methyl–1, 4–Dithiacycloheptane from Diallyl Sulfide and Hydrogen Sulfide", Irkutsk Institute of Organic Chemistry, Siberian Branch, Academy of Sciences of USSR, tranl. from Ivestya Akademii Nauk SSSR, Seriya Kemicheskaya, No. 11, pp. 2669–2670 (Nov. 1992).

E. Klenn, et al., "Untersuchungen zur linearen Thiol–En–Photopolymerisation", J. Makromol Chem. 191, 2403–2411 (1990).

Organic Sulfur Compounds, vol. 1, 260–263, N. Kharasch ed., Pergamon Press (1961).

Organic Chemistry of Sulfur, S. Oae ed., 119, 129–130, Plenum Press, New York (1997).

O. Nuyken et al., "New Telechelic Polymers and Sequential Copolymers by Polyfunctional Initiator—Transfer Agents (Inifers)", Polymer Bulletin 4, 61–65 (1981).

E. Klemm et al., "Unusual addition by the thiol–ene photopolymerization", Polymer Bulletin 28, 653–656 (1992).

O. Nuyken et al., "New Sulfur Containing Polymers", Polymer Bulletin 11, pp 165–170 (1984).

E. Klemm et al., "Addition Polymerization of Aliphatic Dithiols with Diene Monomers", J. Macromol. Sci–Chem., A28(9), 875–883 (1991).

O. Nuyken, et al., "Telechelies via addition of dithiols onto diolefins", J. Macromol. Chem. 192, 1959–1968 (1991).

B. Saville, "Acid–catalysed Addition of Thiols to Conjugated Dienes", The Natural Rubber Producers Research Association, 976, 5040–5045 (rec'd Sep. 20, 1961).

(List continued on next page.)

Primary Examiner—Rachel Gorr
(74) Attorney, Agent, or Firm—Deborah M. Altman

(57) ABSTRACT

A polyurethane material, the coatings prepared therefrom, and methods of making the same are provided. An anionic self-crosslinkable polyurethane material has a weight average molecular weight of less than 15,000 grams per mole and, when cured, has a toughness of at least 20 MPa according to TOUGHNESS TEST METHOD at a temperature of 25° C.

60 Claims, No Drawings

OTHER PUBLICATIONS

N. Haucourt et al., "Spontaneous Block–Copolymer Formation by Cationic Polymerization of a Vinyl Ether in the Presence of a Cyclic Sulfide", Macromolecules 27, 1329–1333 (1994).

K. Yamaguchi et al., "Reaction of thiol to diene polymer in the presence of various catalysts", Polymer, vol. 14, pp. 87–90, (Mar. 1973).

B. Amedurl, "Synthesis of telechelic monodispersed dithiols", Polymer Bulletin 26, pp. 377–382 (1991).

O. Nuyken, "Telechelics via addition of dithiols ontol alkadienes", J. Macromol. Chem., Rapid Commun. II, pp. 365–373 (1990).

* cited by examiner

CURABLE POLYURETHANES, COATINGS PREPARED THEREFROM, AND METHOD OF MAKING THE SAME

CROSS-REFERENCE TO RELATED APPLICATION

This application claims priority from provisional U.S. patent application Ser. No. 60/234,514, filed Sep. 22, 2000, and is related to U.S. patent application Ser. No. 09/611,051, now U.S. Pat. No. 6,423,425, and Ser. No. 09/668,085, filed Jul. 6, 2000 and Sept. 22, 2000, respectively, which are Continuations-In-Part of U.S. patent application Ser. No. 09/309,851, filed May 11, 1999, now U.S. Pat. No. 6,248,225B1.

FIELD OF THE INVENTION

The present invention is directed to a curable polyurethane material, coatings prepared therefrom, and methods of making the same.

BACKGROUND OF THE INVENTION

Coating formulations find use in various industries including the coating and/or painting of motor vehicles. In these industries, and in the automotive industry in particular, considerable efforts have been expended to develop coating compositions with improved performance properties. In the automotive industry, for example, numerous approaches have been advanced to achieve improved chip resistance and corrosion protection. These efforts have included, for example, applying up to 6 or more individually applied coating layers over the substrate by one or more coating methods.

These coatings may be applied by either electrophoretic or non-electrophoretic coating methods. Electrodeposition has become increasingly important in the coatings industry because, by comparison with non-electrophoretic coating means, electrodeposition offers higher paint utilization, outstanding corrosion protection, low environmental contamination, and a highly automated process. Generally, cationic electrodeposited coatings provide better corrosion resistance than anionic electrodeposited coatings. Non-electrophoretic coatings, such as sprayable coatings, however, are still widely used throughout the coatings industry because of the relatively low equipment and operating costs associated therewith.

Such efforts have resulted in increased protection of the surface of the substrate and reduced paint loss through chipping when the substrate of the vehicle is hit with solid debris such as gravel and stones. By reducing the difference in impact energy between multiple coating layers, it is believed that chip resistance of the overall coating can be improved, especially for coatings in which the respective coating layers have excessive differences in hardness. It is believed that reducing the hardness differential can lessen delamination between the coating layers such as between the undercoat, an intermediate coat, and a topcoat or an undercoat and an intermediate coat.

In U.S. Pat. No. 5,047,294, this differential is said to be reduced by applying a crosslinked polyurethane resin filler composition between coating layers to improve intercoat adhesion. The filler composition includes a water-dispersible polymer derived from polyisocyanates, high and low molecular weight polyols, compounds reactive with the isocyanate, and monofunctional or active hydrogen-containing compounds. Anhydrides of carboxylic acids, such as trimellitic acid, are disclosed as useful to form the high molecular weight polyol. The coating formulation is typically applied as an intermediate coat between the primer and the topcoat to even out irregularities present in the primer, and improve the overall stone-chip resistance of the coating.

In U.S. Pat. No. 5,674,560, a chip resistant polyolefin type of primer is spray applied over a cationic or anionic electrodeposited coated film before application of a soft intermediate polyester film. The reduction of the differential in impact energy is reportedly maximized when the polyolefin primer is applied over the softer anionic electrodeposited film as opposed to a cationic electrodeposited film.

Even though electrophoretic coatings can provide many advantages over non-electrophoretic coatings, improvements to each are still sought because of the widespread use of both.

Accordingly, the need exists for a polyurethane material useful in coating compositions that can and may be applied to the substrate by electrophoretic and non-electrophoretic coating methods.

SUMMARY OF THE INVENTION

The present invention provides an anionic self-crosslinkable polyurethane material, the polyurethane material having a weight average molecular weight of less than 15,000 grams per mole, wherein the polyurethane material, when cured, has a toughness of at least 20 MPa according to TOUGHNESS TEST METHOD at a temperature of 25° C.

In one embodiment, the polyurethane material comprises isocyanate functional groups, the isocyanate functional groups blocked with a blocking agent. In another embodiment, the polyurethane material is anionic.

The present invention is also directed to a primer coating composition, a basecoat composition, a clearcoat composition, a monocoat composition, and a multicomponent composite coating including the polyurethane material described above. Where the present invention is a multi-component composite composition, at least one of the layers comprises the polyurethane material.

The present invention is also directed to a coated substrate having coated layers applied thereover, at least one of the coated layers comprising the polyurethane material of the present invention.

The present invention is also directed to a process for forming an aqueous composition comprising an anionic self-crosslinkable polyurethane material, the process comprising:

(a) forming the polyurethane material, the polyurethane material having a weight average molecular weight of less than 15,000 grams per mole, wherein the polyurethane material, when cured, has a toughness of at least 20 MPa according to TOUGHNESS TEST METHOD at a temperature of 25° C.; and (b) dispersing the polyurethane material in water to form an aqueous composition.

The present invention is also directed to a process for preparing a coated substrate, comprising, (a) forming a coating on the substrate, the coating being a composition comprising an anionic self-crosslinkable polyurethane material, the polyurethane material having a weight average molecular weight of less than 15,000 grams per mole, wherein the polyurethane material, when cured, has a toughness of at least 20 MPa according to TOUGHNESS TEST METHOD at a temperature of 25° C.; and (b) at least partially curing the coating.

DETAILED DESCRIPTION OF THE INVENTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of urethane/urea groups to give the equivalent weight. For example, urethane/urea equivalent weight is based on the equivalents of urethane and urea groups in the polyurethane/urea material.

As used herein, the term "polymer" is meant to refer to oligomers and both homopolymers and copolymers. Also, as used herein, the term "polyurethane material" is meant to include polyurethanes, polyureas, and mixtures thereof.

Also for molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2–45, which is incorporated herein by reference in its entirety.

As used herein "based on total weight of the resin solids" of the composition means that the amount of the component added during the formation of the composition is based upon the total weight of the resin solids (non-volatiles) of the film forming materials, polyurethanes, cross-linkers, and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, "formed from" denotes open, e.g., "comprising," claim language. As such, it is intended that a composition "formed from" a list of recited components be a composition comprising at least these recited components, and can further comprise other nonrecited components during is the composition's formation.

As used herein, the term "cure" as used in connection with a composition, e.g., "a curable polyurethane material", "a cured composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The average particle size can be measured according to known laser scattering techniques. For example, the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

As used herein, "TOUGHNESS TEST METHOD" refers to test procedures for determining tensile properties of polymeric materials based upon a modified form of ASTM # D 2370-92, entitled "Standard Test Method for Tensile Properties of Organic Coatings" (1992), incorporated by reference herein in its entirety. Relative to ASTM # D 2370-92, The TOUGHNESS TEST METHOD provides for the preparation of flexible coatings that are cured at relatively low temperatures (less than about 100° C.) using a non-adhering substrate such as polypropylene, polyvinylfluoride, or Teflon™. A liquid coating is applied to the substrate (spray or wire bar) and is thereafter cured or aged. The coating is then cut into a ½"×4" free film sample size, and peeled from the substrate. But for these modifications, the TOUGHNESS TEST METHOD" incorporates the same testing procedures as ASTM # D 2370-92.

The present invention is directed to a curable polyurethane material, coatings prepared therefrom, and methods of making the same.

The curable polyurethane material may be formed from the reaction product of components comprising at least one polyisocyanate, at least one active hydrogen-containing material, at least one polymeric polyamine, such as a polyoxyalkylene polyamine, at least one material having at least one primary or secondary amino group and at least one hydroxyl group, and at least one acid functional material or anhydride having a functional group reactive with isocyanate or hydroxyl groups of other components from which the polyurethane material is formed. Preferably, the polyurethane material is capable of self-crosslinking, i.e., it contains reactive groups which are capable of reacting with each other to form a crosslinked network. For example, in one embodiment of the present invention, an isocyanate group and a hydroxyl group are capable of reacting with each other to form a crosslinked network.

Suitable polyisocyanates used for preparing the polyurethane material include aliphatical, cycloaliphatical, araliphatical, and/or aromatic isocyanates, and mixtures thereof. Preferably, the polyisocyanate is aliphatic or cycloaliphatic.

Examples of useful aliphatic and cycloaliphatic polyisocyanates include 4,4-methylenebisdicyclohexyl diisocyanate (hydrogenated MDI), hexamethylene diisocyanate (HDI), isophorone diisocyanate (IPDI), methylenebis (cyclohexyl isocyanate), trimethyl hexamethylene diisocyanate (TMDI), meta-tetramethylxylylene diisocyanate (TMXDI), and cyclohexylene diisocyanate (hydrogenated XDI). Other aliphatic polyisocyanates include isocyanurates of IPDI and HDI.

Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

Polyisocyanate derivatives prepared from hexamethylene diisocyanate, 1-isocyanato-3,3,5-trimethyl-5-isocyanatomethylcyclohexane ("IPDI"), including isocyanurates thereof, and/or 4,4'-bis(isocyanatocyclohexyl) methane are suitable.

The amount of polyisocyanate used to prepare the polyurethane material generally ranges from about 10 to about 60 percent by weight, preferably about 20 to about 50 percent by weight, and more preferably about 30 to about 45 percent by weight based on total weight of the resin solids used to prepare the polyurethane material.

The components from which the polyurethane material is formed comprise at least one active hydrogen-containing material. The term "active hydrogen" means those groups that are reactive with isocyanates as determined by the Zerewitnoff test as is described in the JOURNAL OF THE AMERICAN CHEMICAL SOCIETY, Vol. 49, page 3181 (1927). Preferably, the active hydrogens are polyols. Non-limiting examples of suitable active hydrogen-containing materials comprise polyols, polyethers, polyesters, polycarbonates, polyamides, polyurethanes, polyureas, and mixtures thereof. Preferably, the active hydrogen-containing material does not include acid functional groups.

In one embodiment, the active hydrogen-containing material may be one or more low molecular weight polyols such as those having two to four hydroxyl groups. The weight average molecular weight of the low molecular weight polyol is typically less than 3000, and is preferably less than 700, and may be between 60 and 250 grams per mole. Examples of suitable low molecular weight polyols include diols, triols, and tetraols having 1 to 10 carbon atoms such as ethylene glycol, 1,2-propylene glycol, 1,4-butanediol, trimethylolpropane (preferred), ditrimethylolpropane, trimethylolethane, glycerol, pentaerythritol and sorbitol. Examples of other low molecular weight polyols are ether polyols such as diethylene glycol and ethoxylated bisphenol A.

The low molecular weight polyols can be used in amounts of up to about 50 percent by weight, and preferably from about 2 to about 50 percent based on the total weight of the resin solids used to prepare the polyurethane material.

In another embodiment, the active hydrogen-containing material can comprise one or more active hydrogen-containing material. These materials preferably have an average active hydrogen functionality ranging from about 2 to 8, preferably from about 2 to 4, as determined by the Zerewitnoff test. The weight average molecular weight of the active hydrogen-containing material preferably ranges from about 400 to 10,000, more preferably from 400 to 3,000 grams per mole.

The glass transition temperature (Tg) of the active hydrogen-containing material is preferably about −120° C. to about 50° C., and more preferably about 0° C. or less. Polyether polyols and polyester polyols are preferred. Glass transition temperature (Tg) (°C.) is determined using a Differential Scanning Calorimeter (DSC), for example a Perkin Elmer Series 7 Differential Scanning Calorimeter, using a temperature range of about −55° C. to about 150° C. and a scanning rate of about 20° C. per minute. The Tg for many polyethers is available in the literature. Also helpful in determining the Tg is the Clash-Berg method, described in *Advances in Polyurethane Technology,* Burst et al., Wiley & Sons, 1968, pages 88ff.

Examples of polyether polyols include polyalkylene ether (poly(oxyalkylene)) polyols which include those having the following structural formula:

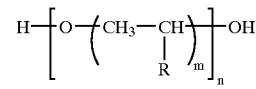

wherein the substituent R is hydrogen or lower alkyl containing from 1 to 5 carbon atoms including mixed substituents, m is an integer from 1 to 4, preferably 1 or 2, and n is an integer typically ranging from 5 to 200. Useful polyether polyols include poly(oxytetramethylene) glycols, such as TERATHANE® 650 (preferred), commercially available from E.I. du Pont de Nemours and Company, LaPorte, Tex., poly(oxyethylene) glycols, poly(oxy-1,2-propylene) glycols and the reaction products of ethylene glycol with a mixture of 1,2-propylene oxide and ethylene oxide. These materials are obtained by the polymerization of alkylene oxides such as ethylene oxide, propylene oxide and tetrahydrofuran.

Also, polyethers obtained from the oxyalkylation of various polyols, for example, diols such as 1,6-hexanediol or higher polyols such as trimethylolpropane and sorbitol can be used. One commonly utilized oxyalkylation method is by reacting a polyol with alkylene oxide such as ethylene or propylene oxide in the presence of an acidic or basic catalyst in a manner well known to those skilled in the art.

Examples of other active hydrogen-containing polyethers are polymeric polyamines such as polyether polyamines. Preferred polyether polyamines include polyoxyalkylene polyamines. In the practice of the invention, where the expression "polyoxyalkylene polyamines" is used, what is intended are polyamines containing both oxyalkylene groups and at least two amine groups, preferably primary amine groups, per molecule.

An example of a preferred polyoxyalkylene polyamine is represented by the following structural formula:

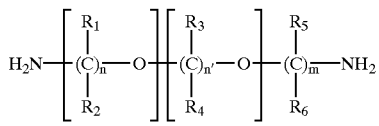

wherein m can range from 0 to about 50, n can range from about 1 to about 50, n' can range from about 1 to about 50, x can range from about 1 to about 50, y can range from 0 to about 50 and $R_1$ through $R_6$ can be the same or different and can be independently selected from the group consisting of hydrogen or lower alkyl radicals preferably having about 1 to about 6 carbon atoms.

Another example of a useful polyoxyalkylene polyamine are those of the structure:

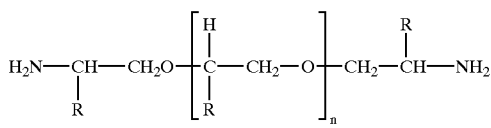

wherein R can be the same or different and is selected from hydrogen, lower alkyl radicals having from 1 to 6 carbon atoms, and n represents an integer ranging from about 1 to about 50, preferably about 1 to about 35. Non-limiting examples of preferred polyoxyalkylene polyamines include polyoxypropylene diamines such as Jeffamine® D-2000 (preferred) and Jeffamine® D-400, commercially available from Huntsman Corporation, Houston, Tex. A number of such other polyoxyalkylene polyamines are described in more detail in U.S. Pat. No. 3,236,895, column 2, lines 40–72; methods of preparation of the polyoxyalkylene polyamines are illustrated in the patent in Examples 4, 5, 6 and 8–12 in columns 4 to 9 thereof; the aforementioned portions of U.S. Pat. No. 3,236,895 hereby being incorporated by reference.

Mixed polyoxyalkylene polyamines can be used, that is, those in which the oxyalkylene group can be selected from more than one moiety. Examples include mixed polyoxyethylene-propylenepolyamines such as those having the following structural formula:

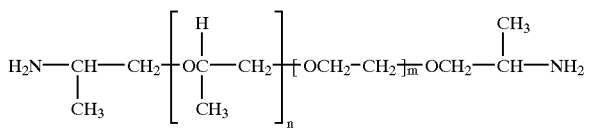

wherein m is an integer ranging from about 1 to about 49, preferably about 1 to about 34, and n is an integer ranging from about 1 to about 34 and where the sum of n+m is equal to about 1 to about 50, preferably about 1 to about 35.

Besides the polyoxyalkylenepolyamines mentioned above, derivatives of polyoxyalkylenepolyols may also be used. Examples of suitable derivatives would be aminoalkylene derivatives which are prepared by reacting polyoxyalkylenepolyols such as those mentioned above with acrylonitrile followed by hydrogenation of the reaction product in a manner well known to those skilled in the art. An example of a suitable derivative would be polytetramethylene glycol bis(3-aminopropyl(ether)). Other suitable derivatives would have the following structural formula:

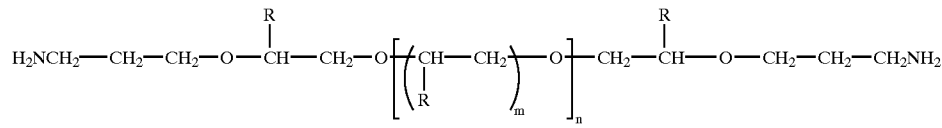

wherein the substituent R is hydrogen or lower alkyl containing from 1 to 5 carbon atoms including mixed substituents, m is an integer from 1 to 4, preferably 1 or 2, and n is an integer typically ranging from 5 to 200.

For mixed oxyethylene-propylene groups in the polyether segment, it is preferred that the oxypropylene content be at least 60 weight percent, more preferably at least 70 weight percent, more preferably at least 80 weight percent based on total weight of the resin solids.

The polyether segment can be derived from a single type of polyether polyol or polyamine or various mixtures thereof. Preferred are mixtures of polyether polyols such as polyoxytetramethylene diol and polyether polyamines such as polyoxypropylenediamine in weight ratios of 0.5:1 to 10:1, preferably 0.5:1 to 7:1, and most preferably 0.6:1.

Other suitable polyols include polycarbonate diols, polyester diols, hydroxyl-containing polydiene polymers, hydroxyl-containing acrylic polymers, and mixtures thereof.

Examples of polyester polyols and hydroxyl containing acrylic polymers are described in U.S. Pat. Nos. 3,962,522 and 4,034,017, respectively, which are incorporated herein by reference. Examples of polycarbonate polyols are described in U.S. Pat. No. 4,692,383 in col. 1, line 58 to col. 4, line 14, which is incorporated herein by reference. Examples of hydroxyl-containing polydiene polymers are disclosed in U.S. Pat. No. 5,863,646, col. 2, lines 11–54, which is incorporated herein by reference. These polymeric polyols generally can have a weight average molecular weight ranging from 400 to 10,000 grams per mole.

Generally, the amount of active hydrogen-containing material that is used to prepare the polyurethane is at least about 30 weight percent, preferably at least about 35 weight percent, and more preferably from about 35 to about 50 percent by weight based on total weight of the resin solids used to make the polyurethane material.

The polyisocyanate(s) and active hydrogen-containing material(s) may be added with some or all of the components that form the polyurethane of the present invention, but preferably are prereacted together in a manner well known to those skilled in the art to form a prepolymer prior to reaction with the other components used to prepare the polyurethane material. For example, the polyisocyanate(s) and active hydrogen-containing material(s) may be prereacted at between 40–90° C. using up to about 0.5%, and preferably about 0.04%, dibutyl tin dilaurate. Generally, the ratio of isocyanate equivalents to active hydrogen equivalents ranges from 10:1 to 2:1, and more preferably 5.1 to 2:1.

The components from which the polyurethane material is formed comprise at least one polyamine, preferably a polyoxyalkylene polyamine such as are described above. This polyoxyalkylene polyamine can be the same or different from the polyoxyalkylene polyamine used to prepare the prepolymer above, although preferably it is different. As used herein, with respect to components, "different" means that the respective components do not have the same chemical structure.

Other useful polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

Based upon the total weight of resin solids from which the polyurethane material is formed, the amount of polyamine can range from about 1 to 40 weight percent, preferably about 5 to about 40 weight percent, and more preferably about 10 to about 30 weight percent. In one embodiment, the amount of polyamine present in the polyurethane material is about 14 weight percent based on the total weight of the resin solids.

The components from which the polyurethane material is formed comprise at least one material having at least one primary or secondary amino group and at least one hydroxyl group. This material is different from the active hydrogen-containing material component and polyamine component discussed above, i.e., it has a chemically different structure. Nonlimiting examples of such materials include primary amines, secondary amines, diethanolamine, ethanlolamine, N-methyl ethanolamine, 2-amino-1-propanol, 2-amino-2-methyl-1-propanol, 2-amino-2-methyl-1,3-propanediol, diisopropanolamine, 2-amino-2-ethyl-1,3-propanediol, tris (hydroxymethyl) amino-methane, and mixtures thereof.

Based upon the total weight of resin solids from which the polyurethane material is formed, the amount of material having at least one primary or secondary amino group and at least one hydroxyl group can range from about 2 to about 20, and preferably about 3 to about 10 weight percent.

The components from which the polyurethane material is formed comprise at least one acid functional material or anhydride having a functional group reactive with the isocyanate or hydroxyl groups of other components from which the polyurethane material is formed. Useful acid functional materials include compounds and polymers having the structure:

X—Y—Z wherein X is OH, SH, NH$_2$, or NHR, and R includes alkyl, aryl, cycloalkyl, substituted alkyl, substituted aryl, and substituted cycloalkyl groups, and mixtures thereof; Y includes alkyl, aryl, cycloalkyl, substituted alkyl, substituted aryl, and substituted cycloalkyl groups, and mixtures thereof; and Z includes OSO$_3$H, COOH, OPO$_3$H$_2$, SO$_2$OH, POOH, and PO$_3$H$_2$, and mixtures thereof. Examples of suitable acid functional materials include hydroxypivalic acid (preferred), 3-hydroxy butyric acid, D,L-tropic acid, D,L hydroxy malonic acid, D,L-malic acid, citric acid, throglycolic acid, glycolic acid, amino acid, 12-hydroxy stearic acid, mercapto propionic acid, mercapto butyric acid, mercapto-succinic acid, and mixtures thereof. Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyurethane. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, trimellitic anhydride (preferred), chlorendic anhydride, itaconic anhydride, citraconic anhydride, maleic anhydride, and mixtures thereof.

The acid functional material or anhydride provides the polyurethane material with anionic ionizable groups which can be ionized for solubilizing the polymer in water. For the purposes of this invention, the term "ionizable" means a group capable of becoming ionic, i.e., capable of dissociating into ions or becoming electrically charged. The acid is neutralized with base to from a carboxylate salt group. Examples of anionic groups include —OSO$_3^-$, —COO$^-$, —OPO$_3^=$, —SO$_2$O$^-$, —POO$^-$; and PO$_3^=$, with COO$^-$ being preferred.

The amount of acid functional material or anhydride that is used to prepare the polyurethane material is at least about 2 percent, preferably ranging from at least about 3 to about 8 percent, and more preferably ranging from about 3 to about 4 percent by weight based on total weight of the resin solids used to form the polyurethane material.

The acid groups are neutralized with a base. Neutralization can range from about 0.1 to about 2.0, preferably about 0.4 to about 1.3, of the total theoretical neutralization equivalent. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like. The appropriate amount of the neutralizing agent is about 0.1 to about 1.0 times, preferably about 0.4 to about 1.0 times the total theoretical neutralization equivalent.

The components from which the polyurethane material is formed can further comprise at least one polyoxyalkylene polyol. Nonlimiting examples of suitable polyoxyalkylene polyols include polyoxyethylene polyols, polyoxypropylene polyols, polyoxybutylene polyols and mixtures thereof. Suitable polyoxyalkylene polyols include, for example, polytetrahydrofuran.

The amount of polyoxyalkylene polyol that is used to prepare the polyurethane material is at least about 10 percent, preferably ranging from at least about 15 to about 50 percent, and more preferably ranging from about to about 40 percent by weight based on total weight of the resin solids used to form the polyurethane material.

The components can further comprise one or more blocking agents for blocking isocyanate functional groups of the polyurethane material.

Examples of suitable blocking agents used to form the polyurethane include: oximes, such as acetoxime, methyl ethyl ketoxime, acetophenone oxime, cyclohexanone oxime, and methyl isobutyl ketoxime; carbon-hydrogen acid compounds, such as dialkyl malonate, alkyl acetoacetate, and acetylacetone; heterocyclic compounds, such as furfuryl alcohol, 1,2,4-triazole, and 3,5-dimethylpyrazole; lactams such as epsilon-caprolactam; amides, such as methyl acetamide, succimide, and acetanilide; phenols, such as methyl-3-hydroxy-benzoate and methyl-4-hydroxy-benzoate; and amino compounds, such as diisopropylamine, dicyclohexylamine, di-tert-butylamine, piperidine, and 2,2, 6,6-tetramethylpiperidine.

The amount of blocking agent that is used to prepare the polyurethane material is at least about 5, preferably ranging from at least about 7 to about 20, and more preferably ranging from about 8 to about 20 percent by weight based on total weight of the resin solids used to form the polyurethane material.

The polyurethane material may be formed by combining the above-identified components in any suitable arrangement known to one of ordinary skill in the art. For example, in preparing the reaction products of the present invention, the components may be combined in a single step or, as illustrated below, the polyisocyanate and the active hydrogen-containing material may be prereacted under suitable conditions to form a prepolymer prior to reaction with one or more of the remaining components. Any suitable reaction temperatures may be used to form the prepolymer such as, for example, those reaction temperatures that range from about 50° C. to about 180° C. Next the prepolymer can be further reacted with a polyoxyalkylene polyol at any suitable reaction temperature, such as, for example, about 80° C. Then, a blocking agent may be reacted therein for blocking at least a portion of isocyanate groups of prepolymer. Such a reaction may be performed at any suitable reaction temperature, such as, for example, about 60° C. to about 90° C. Thereafter, the polyamine material may be added under any suitable conditions, such as, for example at a reaction temperature of about 70° C. to about 75° C., followed by the addition of the material having at least one primary or secondary amino group and at least one hydroxyl group under any suitable conditions, such as, for example, at a reaction temperature of about 60° C. to about 80° C. Then, the acid functional material or anhydride having a functional group reactive with isocyanate or hydroxyl groups may be reacted therein to form the polyurethane material, under suitable conditions, such as, for example, at a reaction temperature of about 60° C. to about 95° C.

The polyurethane material can be nonionic, anionic or cationic, but preferably is anionic. The polyurethane will have a weight average molecular weight of less than about 15,000 grams per mole, preferably ranging from about 3,000 to about 10,000 grams per mole, and more preferably ranging from about 4,000 to about 8,000 grams per mole. The molecular weight of the polyurethane and other polymeric materials used in the practice of the invention is determined by gel permeation chromatography using a polystyrene standard. The polyurethane also has active hydrogen functionality, i.e., hydroxyl, primary or secondary amine, and typically has an active hydrogen equivalent weight of about 500 to about 2500 grams per equivalent, preferably about 800 to about 1500 grams per equivalent, and most preferably about 800 to about 1200 grams per equivalent. The polyurethane material also may have a combined urethane/urea equivalent weight ranging from about 200 to about 400 grams per equivalent, and preferably from about 220 to about 320 grams per equivalent. The polyurethane material, when cured, has a toughness of at least about 20 MPa, preferably from about 20 to about 60 MPa, and more preferably from about 20 to about 50 MPa.

One nonlimiting example of the reaction chemistry of one embodiment of a polyurethane material of the present invention is as follows:

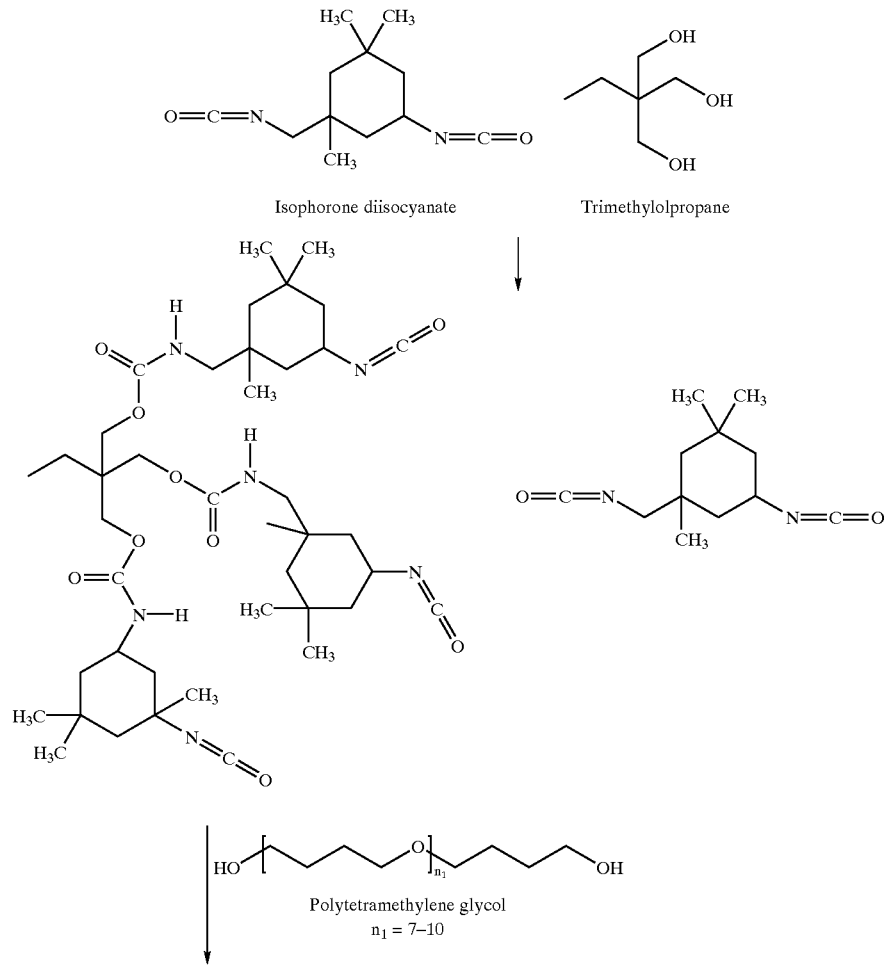

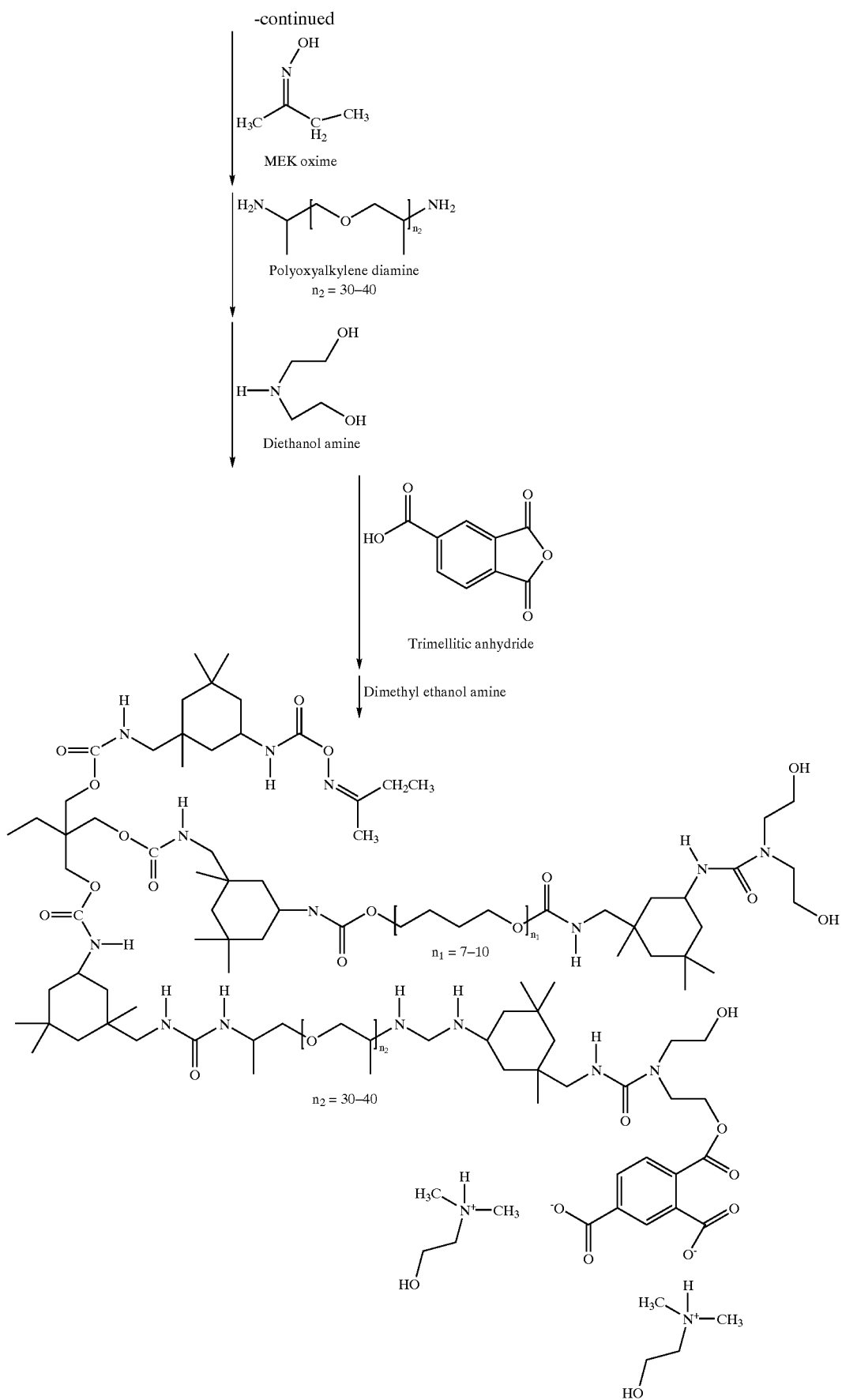

The polyurethane material is useful for forming powder, liquid, and powder slurry compositions. Preferably, the polyurethane material is present in an aqueous composition.

The polyurethane material of the present invention may be present in a composition in the form of an aqueous dispersion. The term "dispersion" is a two-phase transparent, translucent or opaque resinous system in which the resin is in the dispersed phase and the water is the continuous phase. The average particle size of the resinous phase is generally less than 1.0 micron and usually less than 0.5 microns, preferably less than 0.2 micron.

Generally, the concentration of the resinous phase in the aqueous medium ranges from about 10 to about 60 percent, and usually about 40 to about 55 percent, and preferably about 43 to about 55 percent by weight based on total weight of the aqueous dispersion.

The composition can further comprise other thermosettable film-forming materials, such as polyurethanes which are chemically different from those discussed above, acrylics, polyesters and epoxy functional materials.

Suitable polyurethane film-forming materials include the reaction products of polymeric polyols such as polyester polyols or acrylic polyols with a polyisocyanate such as are discussed above. Suitable acrylic polymers include polymers of acrylic acid, methacrylic acid and alkyl esters thereof. Other useful film-forming materials and other components for primers are disclosed in U.S. Pat. Nos. 4,971,837; 5,492,731 and 5,262,464, which are incorporated herein by reference. The amount of film-forming material in the composition can range from about 30 to about 100 weight percent, and preferably about 40 to about 60 weight percent on a basis of total resin solids weight of the composition.

To achieve optimum chip resistance and durability, the polyurethane material is curable or thermosettable. Preferably, the polyurethane material is self-crosslinking, although external crosslinking agents such as isocyanates blocked with oximes, such as methyl ethyl ketoxime, or aminoplasts, can be used. Other useful external crosslinking agents include polyisocyanates such as those described above.

The polyisocyanate may be fully capped with essentially no free isocyanate groups and present as a separate component or it may be partially capped and reacted with hydroxyl or amine groups in the polyurethane backbone. Examples of suitable polyisocyanates and capping agents are those described in U.S. Pat. No. 3,947,339, which is incorporated herein by reference in its entirety.

When the crosslinking agent contains free isocyanate groups, the film-forming composition is preferably a two-package composition (one package comprising the crosslinking agent and the other comprising the hydroxyl functional polymer) in order to maintain storage stability. Fully capped polyisocyanates are described in U.S. Pat. No. 3,984,299, which is incorporated herein by reference in its entirety.

The polyisocyanate can be an aliphatic, cycloaliphatic or an aromatic polyisocyanate or a mixture thereof. Diisocyanates are preferred, although higher polyisocyanates can be used in place of or in combination with diisocyanates. Aliphatic or cycloaliphatic polyisocyanates are preferred.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4''-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate, and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime (preferred), acetone oxime and cyclohexanone oxime, lactams such as epsilon-caprolactam, and amines such as dibutyl amine.

The crosslinking agent may be present in the thermosetting compositions of the present invention in an amount of at least 1 percent by weight, preferably at least 15 percent by weight, based on total resin solids weight of the composition and the hydroxy functional material present. The crosslinking agent is also typically present in the composition in an amount of less than 60 percent by weight, preferably less than 50 percent by weight, and more preferably less than 40 percent by weight, based on total resin solids weight of the composition. The amount of crosslinking agent present in the thermosetting composition of the present invention may range between any combination of these values, inclusive of the recited values.

The equivalent ratio of hydroxyl groups in the polymer to reactive functional groups in the crosslinking agent is typically within the range of 1:0.5 to 1.5, preferably 1.0 to 1.5.

Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product that is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups is etherified with an alcohol to modify the cure response. Any monohydric alcohol may be employed for this purpose including methanol, ethanol, butanol, isobutanol, and hexanol.

Preferably, the aminoplasts that are used are melamine-, urea-, glycouril, or benzoguanamine-formaldehyde condensates etherified with an alcohol containing from one to four carbon atoms.

The aminoplast may be present in the composition in amounts of about 5 to about 60, preferably about 15 to about 50 percent by weight based on the total weight of resin solids.

The thermosetting composition may also contain catalysts to accelerate the cure of the crosslinking agent with reactive groups on the polymer(s). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.08 to about 2.0 percent by weight, based on the total weight of resin solids in the thermosetting composition.

Other ingredients such as pigments and fillers can be present in the polyurethane composition. Useful pigments include hiding pigments such as titanium dioxide, zinc oxide, antimony oxide, etc. and organic or inorganic UV opacifying pigments such as iron oxide, transparent red or yellow iron oxide, carbon black, phthalocyanine blue, and the like. Useful fillers include barium sulfate, magnesium silicate, calcium carbonate, and silica. Fillers and pigments can be present in amounts of up to 60 parts by weight or less based on 100 parts by weight of total solids of the composition.

Other optional ingredients include anti-oxidants, UV-absorbers and hindered amine light stabilizers, such as for example, hindered phenols, benzophenones, benzotriazoles, triazoles, triazines, benzoates, piperidinyl compounds and mixtures thereof. These ingredients are typically added in amounts up to about 2 percent based on the total weight of resin solids of the composition. Other optional ingredients include co-solvents, coalescing aids, defoamers, plasticizers, associative thickeners, bactericides and the like.

Most electroconductive substrates, especially metal substrates such as steel, zinc, aluminum, copper, magnesium, or the like and galvanized metals such as any galvanized steels and the like whether hot dip galvanized or electrogalvanized or other galvanizing method can be coated with the electrodepositable compositions. Steel substrates are preferred. It is customary to pretreat the substrate with a phosphate conversion coating, usually a zinc phosphate conversion coating, followed by a rinse that seals the conversion coating. Pretreatments are well known to those skilled in the art. Examples of suitable pretreatment compositions are disclosed in U.S. Pat. Nos. 4,793,867 and 5,588,989, which are incorporated herein by reference in their entirety.

In a preferred embodiment, the coating composition can be deposited upon a substrate or over an existing coating by nonelectrophoretic means such as spray application, which will be discussed in detail below.

It is contemplated that depending upon the desired application and use the polyurethane compositions of the present invention may be incorporated into any liquid coating composition, powder coating composition, or aqueous slurry coating composition. As described hereinbelow, the percent solids of the polyurethane material present in the coating composition and the thickness of the polyurethane composition as applied to the substrate can vary based upon such factors as the particular coating that uses the polyurethane material of the present invention, i.e. whether the polyurethane material is used in a primer coating, basecoat, clearcoat, topcoat, or combinations thereof, or monocoat composition; and the type of substrate and intended use of the substrate, i.e. the environment in which the substrate is placed and the nature of the contacting materials.

In addition, it is contemplated that the polyurethane material composition of the present invention may be incorporated into one or more coating compositions to form a multicomponent composite coating for application over a substrate. For example, in one embodiment of the present invention, the present invention may be a multicomponent composite coating comprising a primer deposited from a primer coating composition and a topcoat applied over at least a portion of the primer in which the topcoat is deposited, wherein at least one of the primer composition and the topcoat composition comprise the polyurethane material of the present invention. In another embodiment of the present invention, the present invention may be a multicomponent composite coating comprising a basecoat deposited from a pigmented coating composition and a clearcoat applied over at least a portion of the basecoat, the clearcoat being deposited from a clearcoating composition, wherein at least one of the basecoat composition and the clearcoating composition comprise the polyurethane material of the present invention.

The composition of the present invention may be applied onto the surface of the substrate or over a polymeric underlayer by any suitable coating process known to those of ordinary skill in the art, for example, by dip coating, direct roll coating, reverse roll coating, curtain coating, spray coating, brush coating, electrostatic spray coating, and combinations thereof. The method and apparatus for applying the coating composition to the substrate is determined in part by the configuration and type of substrate material. In this regard, the coatings of the present invention may be applied over either metal or plastic substrates by these application methods. When applied over a plastic substrate, the compositions of the present invention are at least partially cured at a temperature below the thermal deformation temperature of the plastics.

For example, the polyurethane composition employed in a primer/topcoat composite in a wet-on-wet application. In this example, the polyurethane material may be incorporated into one or both of the primer and topcoat layers. The following example is provided by way of illustration only, as one of ordinary skill in the art will recognize that the polyurethane material-containing composition may, but need not, be applied in a wet-on-wet application, and that other coatings, such as powder coatings, and coating methods may be employed.

A substantially uncured coating of the primer coating composition is formed on the surface of the substrate during application of the primer coating composition to the substrate. In a preferred embodiment, the surface of the substrate is pretreated as discussed above and electrocoated with about 20 to about 50 microns of electrodeposition coating, which is commercially available from PPG Industries, Inc. Other suitable electrodepositable coatings include those disclosed in U.S. Pat. Nos. 4,891,111; 4,933,056 and 5,760,107, which are hereby incorporated by reference in their entirety.

The primer composition can be a waterborne coating or solventborne coating for wet-on-wet application, as desired, but is preferably a waterborne coating. The primer coating composition may contain the polyurethane material of the present invention or may be a conventional primer coating composition as described, for example, in U.S. Pat. Nos. 5,126,393; 5,280,067; 5,297,665; 5,589,228 and 5,905,132, which are incorporated herein by reference in their entirety.

When the primer composition contains the polyurethane material of the present invention, the percent solids of the polyurethane in the primer composition may range from about 5 to about 100 percent, and is typically about 20 to about 100 percent by weight based on total weight of the resin solids of the primer composition.

The primer composition can be applied to the surface of the substrate by any suitable coating process known to those of ordinary skill in the art, for example, by dip coating, direct roll coating, reverse roll coating, curtain coating, spray coating, brush coating, electrostatic spray coating, and combinations thereof.

A substantially uncured primer coating is formed during application of the primer. As used herein, "substantially uncured" coating means that the coating composition, after application to the surface of the substrate, forms a film or coating that is substantially uncrosslinked, i.e., is not heated to a temperature sufficient to induce significant crosslinking and there is substantially no chemical reaction between the thermosettable dispersion and the crosslinking material.

During application of the primer coating composition to the substrate, ambient relative humidity generally can range from about 30 to about 90 percent, preferably about 60 percent to 80 percent.

After application of the aqueous primer coating composition to the substrate, the primer coating can be at least partially dried by evaporating water and solvent (if present) from the surface of the film by air drying at ambient (about 25° C.) or an elevated temperature for a period sufficient to dry the film but not significantly crosslink the components of the primer coating. The heating is preferably only for a short period of time sufficient to ensure that a topcoat composition can be applied over the primer coating essentially without dissolving the primer coating. Suitable drying conditions will depend on the components of the primer coating and on the ambient humidity, but in general a drying time of about 1 to about 5 minutes at a temperature of about 80° F. to about 250° F. (about 20° C. to about 121° C.) will be adequate to ensure that mixing of the primer coating and the topcoat composition is minimized. Preferably, the drying temperature ranges from about 20° C. to about 80° C., and more preferably about 20° C. to about 50° C. Also, multiple primer coating compositions can be applied to develop the optimum appearance. Usually between coats, the previously applied coat is flashed; that is, exposed to ambient conditions for about 1 to 20 minutes.

Typically, the coating thickness of the primer coating after final drying and curing of the multilayer composite coating ranges from about 0.4 to about 2 mils (about 10 to about 50 micrometers), and preferably about 1.0 to about 1.5 mils (about 25 to about 38 micrometers).

A topcoat composition is applied to at least a portion of a surface of the primer coating in a wet-on-wet application without substantially curing the primer coating. The topcoat composition may contain the polyurethane material of the present invention or may be a conventional topcoat coating composition as described, for example, in U.S. Pat. Nos. 4,403,003; 4,978,708; 5,071,904; 5,368,944; 5,739,194; 5,667,847 and 6,093,497, which are incorporated herein by reference in their entirety. Other suitable compositions are those formulations commercially available by PPG Industries, Inc. under the tradename HWB and DWB. When the topcoat composition contains the polyurethane material of the present invention, the percent solids of the polyurethane in the topcoat composition may range from about 5 to about 100 percent, and is typically about 50 to about 95 percent by weight based on total weight of the resin solids of the topcoat composition.

The topcoat composition can be a waterborne coating or solventborne coating for wet-on-wet application, as desired, but is preferably a waterborne coating. The topcoat may be a monocoat or a system incorporating a basecoat plus clearcoat, which is preferred.

The following example illustrates the polyurethane material employed in a basecoat/clearcoat composite in a wet-on-wet application. As discussed above, the following example is provided by way of illustration only, as one of ordinary skill in the art will recognize that the polyurethane composition may, but need not, be applied in a wet-on-wet application, and that other coatings, such as powder coatings, and coating methods may be employed.

A substantially uncured coating of the basecoat composition is formed onto the substrate during application of the basecoat composition to the substrate. The basecoat composition may contain the polyurethane material of the present invention or may be a conventional basecoat composition as described above. When the basecoat composition contains the polyurethane material of the present invention, the percent solids of the polyurethane in the primer composition may range from about 5 to about 100, and is typically about 40 to about 80 percent by weight based on the total weight of the resin solids of the basecoat composition. Preferably, the basecoat composition is a crosslinkable coating comprising at least one thermosettable film-forming material and at least one crosslinking material, although thermoplastic film-forming materials such as polyolefins can be used. The preferred basecoat composition is set forth below in Example 10. Other suitable basecoats that may be employed in the present invention are those disclosed in U.S. Pat. No. 5,071,904, which is incorporated herein by reference in its entirety.

Suitable resinous binders for organic solvent-based basecoats are disclosed in U.S. Pat. No. 4,220,679 at column 2, line 24 through column 4, line 40 and U.S. Pat. No. 5,196,485 at column 11, line 7 through column 13, line 22. Suitable waterborne base coats for color-plus-clear composites are disclosed in U.S. Pat. No. 4,403,003, and the resinous compositions used in preparing those base coats can be used in the present invention. Also, waterborne polyurethanes such as those prepared in accordance with U.S. Pat. No. 4,147,679 can be used as the resinous binder in the basecoat. Further, waterborne coatings such as those described in U.S. Pat. No. 5,071,904 can be used as the basecoat. Each of the patents discussed above is incorporated by reference herein it their entirety. Other useful film-forming materials for the basecoat coating composition include the hydrophobic polymers and/or reaction product (a) discussed above. Other components of the basecoat composition can include crosslinking materials and additional ingredients such as pigments discussed above. Useful metallic pigments include aluminum flake, bronze flakes, coated mica, nickel flakes, tin flakes, silver flakes, copper flakes and combinations thereof. Other suitable pigments include mica, iron oxides, lead oxides, carbon black, titanium dioxide and talc. The specific pigment to binder ration can vary widely so long as it provides the requisite hiding at the desired film thickness and application solids.

The basecoat composition may be applied to the surface of the substrate by any suitable coating process known to those of ordinary skill in the art, for example, by dip coating, direct roll coating, curtain coating, spray coating, brush coating, electrostatic spray coating, and combinations thereof. During application of the basecoat composition to the substrate, ambient relative humidity generally can range from about 30 to about 90 percent, preferably about 60 percent to 80 percent.

A substantially uncured basecoat is formed during application of the basecoat. Typically, the basecoating thickness after curing of the substrate having the multilayered composite coating thereon ranges from about 0.4 to about 2.0 mils (about 10 to about 50 micrometers), and preferably about 0.5 to about 1.2 mils (about 12 to about 30 micrometers). Some migration of coating materials between the coating layers, preferably less than about 20 weight percent, can occur.

After application of the basecoat composition to the substrate, the basecoat can be at least partially dried by evaporating water and/or solvent from the surface of the film by air drying at ambient (about 25° C.) or an elevated temperature for a period sufficient to dry the film but not significantly crosslink the components of the basecoat composition. The heating is preferably only for a short period of time sufficient to ensure that a clear coating composition can be applied over the basecoat coating essentially without dissolving the basecoat coating. Suitable drying conditions depend on the components of the basecoat composition and on the ambient humidity, but generally the drying conditions are similar to those discussed above with respect to the primer coating. Also, multiple basecoat coating compositions can be applied to develop the optimum appearance. Usually between coats, the previously applied coat is flashed; that is, exposed to ambient conditions for about 1 to 20 minutes.

A clear coating composition is then applied to at least a portion of the basecoat without substantially curing the basecoat coating to form a substantially uncured basecoat/clearcoat composite coating thereon. When the clear coating composition contains the polyurethane material of the present invention, the percent solids of the polyurethane in the clear coating composition may range from about 5 to about 100, and is typically about 50 to about 95 percent by weight. The clear coating composition can be applied to the surface of the basecoat coating by any of the coating processes discussed above for applying the basecoat composition.

The clearcoat composition can be a waterborne coating or solventborne coating for wet-or-wet application, as desired. Where the clearcoat composition contains the polyurethane material of the present invention, the clearcoat composition is preferably a waterborne coating. Preferably the clear coating composition is a crosslinkable coating comprising at least one thermosettable film-forming material and at least one crosslinking material, although thermoplastic film-forming materials such as polyolefins can be used. Suitable conventional waterborne clearcoats are disclosed in U.S. Pat. No. 5,098,947, incorporated herein by reference in its entirety, and are based on water soluble acrylic resins. Useful solvent borne clearcoats are disclosed in U.S. Pat. Nos. 5,196,485 and 5,814,410, incorporated herein by reference in their entirety, and include polyepoxides and polyacid curing agents. (Suitable conventional powder clearcoats are described in U.S. Pat. No. 5,663,240, incorporated herein by reference in their entirety, and include epoxy functional acrylic copolymers and polycarboxylic acid crosslinking agents.) The clear coating composition can include crosslinking materials and additional ingredients such as are discussed above but not pigments.

During application of the clear coating composition to the substrate, ambient relative humidity generally can range from about 30 to about 90 percent, preferably about 60 percent to about 80 percent.

After application of the clear coating composition to the substrate, the composite coating can be at least partially dried by evaporating water and/or solvent from the surface of the film by air drying at ambient (about 25° C.) or an elevated temperature for a period sufficient to dry the film. Preferably, the clear coating composition is dried at a temperature and time sufficient to crosslink the crosslinkable components of the composite coating. Suitable drying conditions depend on the components of the clear coating composition and on the ambient humidity, but generally the drying conditions are similar to those discussed above with respect to the primer coating. Also, multiple clear coating compositions can be applied to develop the optimum appearance. Usually between coats, the previously applied coat is flashed; that is, exposed to ambient conditions for about 1 to 20 minutes.

A substantially uncured coating of the clearcoat/basecoat composite or the topcoat/primer composite is formed on the surface of the substrate during application. Typically, the coating thickness after curing of the multilayered basecoat/clearcoat composite coating on the substrate ranges from about 0.5 to about 4 mils (about 15 to about 100 micrometers), and preferably about 1.2 to about 3 mils (about 30 to about 75 micrometers).

After application of the clearcoating or topcoating composition, the composite coating coated substrate is heated to cure the coating films or layers. In the curing operation, water and/or solvents are evaporated from the surface of the composite coating and the film-forming materials of the coating films are crosslinked. The heating or curing operation is usually carried out at a temperature in the range of from about 160° F. to about 350° F. (about 71° C. to about 177° C.) but if needed, lower or higher temperatures can be used as necessary to activate crosslinking mechanisms. The thickness of the dried and crosslinked composite coating is generally about 0.2 to 5 mils (5 to 125 micrometers), and preferably about 0.4 to 3 mils (10 to 75 micrometers).

In one embodiment, compositions including the polyurethane material of the present invention may be used for electrodeposition coating. Such compositions can include an electroconductive pigment to make the resultant coating electroconductive upon curing. Suitable electroconductive pigments include electrically conductive carbon black pigments. Generally, the carbon blacks can be any one or a blend of carbon blacks ranging from those that are known as higher conductive carbon blacks, i.e. those with a BET surface area greater than 500 $m^2$/gram and DBP adsorption number (determined in accordance with ASTM D2414-93) of 200 to 600 ml/100 g. to those with lower DBP numbers on the order of 30 to 120 ml/100 gram such as those with DBP numbers of 40 to 80 ml/100 grams.

Examples of commercially available carbon blacks include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation Pigments Group. Suitable carbon blacks are also described in U.S. Pat. No. 5,733,962, which is incorporated herein by reference in its entirety.

Also, electrically conductive silica pigments may be used. Examples include "Aerosil 200" sold by Japan Aerosil Co., Ltd., and "Syloid 161", "Syloid 244", "Syloid 308", "Syloid 404" and "Syloid 978" made by Fuji Davison Co., Ltd. Mixtures of different electroconductive pigments can be used.

The amount of electroconductive pigment in the composition can vary depending on specific type of pigment that is used, but the level needs to be effective to provide an electrodeposited coating with a conductivity of greater than or equal to $10^{-12}$ mhos/cm. Stated another way the electrodeposited coating should have a resistivity of less than or equal to $10^{12}$ ohms-cm., preferably a resistance of less than or equal to $10^8$ ohms at typical film builds or thicknesses for electrodeposited coatings. This level is necessary so that upon curing or partial curing the coating becomes electroconductive. Preferably, curing is by heating at a temperature of at least 120° C. (248° F.). Typically, the electroconductive pigment content in the electrodepositable composition is from 5 to 25 percent by weight based on total solids of the electrodeposition composition.

In the process of applying the electrically conductive coating, the aqueous dispersion of the electrodepositable composition is placed in contact with an electrically conductive anode and cathode. Upon passage of an electric current between the anode and cathode, an adherent film of the electrodepositable composition will deposit in a substantially continuous manner on either the anode or the cathode depending on whether the composition is anionically or cationically electrodepositable. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter).

Furthermore, a second electrodepositable coating that may, but need not, contain the polyurethane material of the present invention, may be applied over the first electrodeposition coating, described above, under the processing conditions described herein in order to provide a multiple layer electrodeposited coating.

After electrodeposition, the coating is at least partially cured, typically by heating. Temperatures usually range from about 200° F. to about 400° F. (about 93° C. to about 204° C.), preferably from about 250° F. to 350° F. (about 121° C. to about 177° C.) for a period of time ranging from 10 to 60 minutes. The thickness of the resultant film is usually from about 10 to 50 microns.

The heating or baking of the electrodeposited coating can also be performed by means of infrared radiation ("IR"). Generally, there are three categories of IR. These categories are: near-IR (short wavelength) having a peak wavelength from 0.75 to 2.5 microns ("u") (750 to 2500 nanometers); intermediate-IR (medium wavelength) having a peak wavelength from 2.5 to 4 u (2500 to 4000 nanometers), and far-IR (long wavelength) having a peak wavelength from 4 to 1000 u (4000 to 100,000 nanometers). Any or any combination or all of these categories of IR can be used for the heating to at least partially cure the coating.

Curing can be done in a selective manner. At least one predetermined area of the first electrodeposited coating composition is selectively heated by IR, for example, the exterior surfaces of an automobile body, where such predetermined area is to be coated with the second electrodepositable coating composition. The interior surfaces of the electrocoated substrate are not exposed to the IR and as a result, the first electrocoat coating is not cured on the interior surfaces and does not become electroconductive. Hence the deposition of the second electrodeposited coating layer is only on the exterior surfaces which are electrically conductive. With this treatment, substrates like an automobile body have the cured, conductive, first electrodeposited coating on exterior surfaces and the uncured, nonconductive, first electrodeposited coating on interior surfaces. Upon application of the second electrodeposited coating and curing of both electrodeposited coatings, the exterior surface of the automobile body will have both the first and second electrodeposited coatings and good corrosion and chip resistance where it is needed most. The interior surface will only have the first electrodeposited coating and corrosion resistance but no chip resistance. Since the interior surfaces will not be exposed to road debris, chip resistance is not needed.

When IR heating is used with complex shapes such as automobile bodies, it is preferable to dry the substrate coated with the first electrodeposited coating composition for 2 to 20 minutes, in a standard oven such as a convection, electric, or gas fired oven before exposing the electrocoated substrate to IR. The drying step can be at a temperature sufficient to remove water but not sufficient to cure the coating such that it becomes conductive. Generally, the temperature is less than 120° C.

IR heating can be conducted from 10 seconds to 2 hours, usually from 5 to 20 minutes. Temperatures range from greater than 120° C. to 220° C. (248° F. to 428° F.) and preferably from 130° C. to 190° C. (266° F. to 374° F.).

The aqueous cationic or anionic polyurethane dispersions are typically electrodeposited on the electroconductive coating from an electrodeposition bath having a solids content of 5 to 50 percent by weight. The bath temperature is usually about 15° C. to 35° C. The voltage is from 100 to 400 V (load voltage) using the substrate with the electroconductive coating as a cathode in the case of the cationic polyurethane or as an anode in the case of the anionic polyurethane. The film thickness of the electrodeposited coating is not particularly restricted and can vary largely depending upon the application of finished product, etc. However, the thickness is usually between 3 to 70 microns, particularly 15 to 35 microns in terms of cured film thickness. The baking and curing temperature of the coating film is usually from 100° C. to 250° C. and preferably 140° C. to 200° C. As mentioned above in the case of the selective application of the second electrocoat through use of the IR bake of the first electrodeposited coating, the heating or baking after application of the second electrocoat can cure both the first and second electrocoats on surfaces not exposed to IR heating or baking. Also, the baking can complete the cure of the first electrocoat that was exposed to IR and overcoated with the second electrocoat.

The invention will further be described by reference to the following examples. The following examples are merely illustrative of the invention and are not intended to be limiting. Unless otherwise indicated, all parts are by weight.

EXAMPLES

The preparation and physical property evaluation of anionic polyurethane materials and coatings including the same are described in the Examples below.

Example 1

Hydroxy and Blocked Isocyanate Functional Polyurethane Synthesis

A polyurethane material with both hydroxyl and blocked isocyanate functionality according to the present invention was prepared as follows:

A reaction vessel equipped with a stirrer, a thermocouple, a condenser, and a nitrogen inlet was charged with 2454.5 g of isophorone diisocyanate, 739.9 g of methyl isobutyl ketone and 1.13 g of dibutyl tin dilaurate and heated to 45° C. The isocyanate equivalent was determined from an sample of dibutylamine solution in methyl pyrrolidone.

Excess dibutylamine was titrated with 0.2 N hydrochloric acid in isopropanol. 134.8 g of trimethylolpropane was added and the reaction was allowed to exotherm to 76° C. After cooling the reactants to 65° C., another 134.8 g of trimethylolpropane was added to the reaction vessel. The reaction exothermed to 89° C. The reaction product was allowed to cool to 75° C. After one hour, the isocyanate equivalent weight of the reaction was determined to be 212.7 grams per isocyanate equivalent.

1432.7 g of polytetramethyl glycol (as TERATHANE® 650) was added over one hour followed by 217.5 g of methyl isobutyl ketone. After 30 minutes, the isocyanate equivalent weight of the resulting reaction product was 438.4 grams per equivalent. Then 557.6 g of methyl ethyl ketoxime was added over 30 minutes followed by 362.5 g of methyl isobutyl ketone. The reaction was stirred for 30 minutes and the isocyanate equivalent weight was 1198.1 grams per equivalent. The stirring rate was increased to 500 rpm, the reaction temperature decreased to 70° C. and 875.6 g of polyoxypropylenediamine (as Jeffamine D-2000) was added over two minutes. After stirring an additional 15 minutes, 411.9 g of diethanol amine and 72.5 g of methyl isobutyl ketone were added. The reaction temperature increased to 89° C. The reaction contents were stirred for about 30 minutes until no evidence of isocyanate was observed by FTIR. Then 195.8 g of trimellitic anhydride were added to the reaction flask and the contents stirred for about 4 hours until no anhydride was observed by FTIR and only a few flakes of trimellitic anhydride were observed in the resin. Then, 7.7 g of 2-(2H-Benzotriazol-2-yl)-4,6-bis(1-methyl-1-phenylethyl)phenol (as Tinuvin 900, commercially available from Ciba Specialty Chemicals Corporation, Tarrytown, N.Y.), 7.7 g of Decanedioic acid, bis(2,2,6,6-tetramethyl-4-piperidinyl)ester, reaction products with 1,1-dimethylethylhydroperoxide and octane (as Tinuvin 123, commercially available from Ciba Specialty Chemicals Corporation, Tarrytown, N.Y.) and 15.4 g of methyl isobutyl ketone were added to the reaction contents.

The resultant product had a solids content of 81.7 weight percent (measured for one hour at 110° C.), an acid value of 15.91 mg KOH/g of product, a hydroxyl value of 57.9 mg KOH/g of product and a weight average molecular weight of 4485 g/mole, as determined by gel-permeation chromatography ("GPC").

Example 2

Preparation of Aqueous Dispersion of Hydroxyl and Blocked Isocyanate Polyurethane 1806.4 g of the polyurethane of Example 1 was heated to 74° C. and added over 43 minutes to a solution of 824.7 g of deionized water and 45.6 g of dimethyl ethanol amine at 24° C. stirring at 510 rpm in a gallon sized cylindrical reaction flask equipped with baffles, a double pitched bladed stirrer, commercially available from Saxon Research Systems, Inc, Saxonburg, Pa., a thermocouple, and a condenser. The temperature of the resulting dispersion was 42° C. The dispersion was stirred for 30 minutes while increasing the dispersion temperature to 50° C. Then, the dispersion temperature set point was lowered to 38° C. and 267.7 g of deionized water was added over 20 minutes. The dispersion was stirred for an additional 45 minutes; another 401.1 g of deionized water was added over 25 minutes and the final dispersion stirred for another 45 minutes.

This dispersion was transferred to a flask equipped with a stirrer, thermocouple, and a spiral condenser with water recovery receiver. The dispersion was heated to 60° C. and the methyl isobutyl ketone removed by vacuum distillation.

The final dispersion has a solids content of 47.1 weight percent (measured for one hour at 110° C.), a Brookfield viscosity of 411 centipoise using a #2 spindle at 30 rpm, an acid content of 0.151 meq acid/g (determined by titration with methanolic potassium hydroxide), a base content of 0.163 meq base/g (determined by titration with 0.2 N HCl in isopropanol), a pH of 8.84 (as determined by a pH meter), a residual methyl isobutyl ketone content of 0.21 weight percent (as determined by gas chromatography), a number average particle size of 1890 angstroms and a volume average particle size of 2020 angstroms (as determined by Horiba Model LA 900 laser diffraction particle size instrument).

Example 3

Synthesis of Hydroxy and Blocked Isocyanate Functional Polyurethane Blocked with 3,5-Dimethyl Pyrazole This example illustrates the preparation of a polyurethane material using a different isocyanate blocking group (3,5-dimethylpyrazole) than in Example 1.

A reaction vessel equipped with a stirrer, a thermocouple, a condenser, and a nitrogen inlet was charged with 1269.6 g of isophorone diisocyanate, 382.7 g of methyl isobutyl ketone and 0.59 g of dibutyl tin dilaurate and heated to 45° C. 69.8 g of trimethylolpropane was added and the reaction was allowed to exotherm to 71° C. After cooling the reaction to 65° C., another 69.8 g of trimethylolpropane was added to the reaction flask. The temperature of the reaction product increased to 89° C. The reaction product was allowed to cool to 75° C. After one hour, the isocyanate equivalent weight of the reaction was 216.9 grams per isocyanate equivalent.

741.1 g of TERATHANE® 650 was added over one hour followed by 112.5 g of methyl isobutyl ketone. After 30 minutes, the isocyanate equivalent weight of the reaction was 443.6 grams per equivalent. Then 318.6 g of 3,5-dimethyl pyrazole (available from Clariant International Ltd., Muttenz, Switzerland) was added in three equal portions over 30 minutes followed by 187.5 g methyl isobutyl ketone. The reaction was stirred for 30 minutes and the isocyanate equivalent weight was 1213.3 grams per equivalent. The stirring rate was increased to 500 rpm, the reaction temperature decreased to 70° C. and 453.0 g of Jeffamine D-2000 was added rapidly over two minutes. After stirring an additional 15 minutes, 213.0 g of diethanol amine and 37.5 g of methyl isobutyl ketone were added. The temperature of the reactant product was increased to 89° C. The reaction product was stirred until no evidence of isocyanate was observed by FTIR. Then 101.3 g of trimellitic anhydride were added to the reaction flask and the contents stirred until no anhydride was observed by FTIR and only a few flakes of trimellitic anhydride were observed in the resin. Then 4.0 g of Tinuvin 900, 4.0 g of Tinuvin 123, and 8.0 g of methyl isobutyl ketone were added to the reaction contents.

The resultant product had a solids content of 80.8 weight percent (measured for one hour at 110° C.), an acid value of 15.56 mg KOH/g product, a hydroxyl value of 56.3 mg KOH/g product and a weight average molecular weight of 4154 g/mole.

Example 4

Preparation of Aqueous Dispersion of the Hydroxyl and Blocked Isocyanate Polyurethane of Example 3

1806.4 g of the polyurethane of Example 3 at 74° C. were added over 31 minutes to a solution of 825.7 g of deionized water and 44.6 g of dimethyl ethanol amine stirring at 25° C. at 523 rpm in a gallon sized cylindrical reaction flask equipped with baffles, a double pitched bladed stirrer, a thermocouple, and a condenser. The temperature of the resulting dispersion was 44° C. The dispersion was stirred for 30 minutes while increasing the dispersion temperature to 50° C. Then, the dispersion temperature set point was lowered to 38° C. and 267.7 g of deionized water was added over 20 minutes. The dispersion was stirred for an additional 45 minutes, another 401.5 g of deionized water was added over 25 minutes and the final dispersion stirred for another 45 minutes.

3211 g of dispersion and 321 g of deionized water were transferred to a flask equipped with a stirrer, a thermocouple, and a spiral condenser with water recovery receiver. The dispersion was heated to 60° C. and the methyl isobutyl ketone removed by vacuum distillation.

The final dispersion had a solids content of 41.2 weight percent (measured for one hour at 110° C.), a Brookfield viscosity of 54.6 centipoise using a #2 spindle at 60 rpm, an acid content of 0.134 meq acid/g (determined by titration with methanolic potassium hydroxide), a base content of 0.137 meq base/g (determined by titration with 0.2 N HCl in isopropanol), a pH of 8.54 (as determined by a pH meter), a residual methyl isobutyl ketone content of 0.26 weight percent (as determined by gas chromatography), a number average particle size of 720 angstroms, and a volume average particle size of 860 angstroms (as determined by Horiba Model LA 900 laser diffraction particle size instrument).

Example 5

Synthesis of Hydroxy and Blocked Isocyanate Blocked Polyurethane with Hydroxypivalic Acid This example illustrates the preparation of a polyurethane material having both hydroxyl and blocked isocyanate functionality but the isocyanate was blocked with hydroxy pivalic acid.

A reaction vessel equipped with a stirrer, a thermocouple, a condenser and a nitrogen inlet was charged with 1548.5 g of isophorone diisocyanate, 459.6 g of methyl isobutyl ketone and 0.70 g of dibutyl tin dilaurate and heated to 45° C. 83.7 g of trimethylolpropane was added and the reaction was allowed to exotherm to 74° C. After cooling the reaction to 67° C., another 83.7 g of trimethylolpropane was added to the reaction flask. The temperature of the reaction product increased to 90° C. The reaction product was allowed to cool to 75° C. After one hour the reaction's isocyanate equivalent weight was 227.7 grams per isocyanate equivalent.

889.3 g of TERATHANE® 650 was added over one hour followed by 135.0 g of methyl isobutyl ketone. After 30 minutes, the reaction's isocyanate equivalent weight was 403 grams per equivalent. Then 313.2 g of methyl ethyl ketoxime was added over 30 minutes followed by 90.0 g of methyl isobutyl ketone, 138.7 g of hydroxypivalic acid (from TCI America, Portland, Oreg.) and 135.0 g of methyl isobutyl ketone. The reaction was stirred until the isocyanate equivalent weight was 1425 grams per equivalent.

1292.3 g of this isocyanate prepolymer were charged to a reaction vessel equipped with a stirrer, a thermocouple, a condenser, and a nitrogen inlet. With the vessel contents stirring at 500 rpm and at 78° C., 186.0 g of Jeffamine D-2000 was added over two minutes. After stirring an additional 15 minutes, 50.0 g of diethanol amine and 15.0 g of methyl isobutyl ketone were added. The reaction temperature increased to 82° C. The reaction product was stirred until no evidence of isocyanate was observed by FTIR. Then 1.6 g of Tinuvin 900, 1.6 g of Tinuvin 123 and 3.2 g of methyl isobutyl ketone were added to the reaction contents.

The resultant product had an acid value of 12.3 mg KOH/g product and a weight average molecular weight of 5031 g/mole.

Example 6

Preparation of Aqueous Dispersion of the Hydroxyl and Blocked Isocyanate Polyurethane of Example 5

1341.9 g of the polyurethane of Example 5 at 85° C. were added over 30 minutes to a solution of 623.0 g of deionized water and 26.2 g of dimethyl ethanol amine stirring at 25° C. and at 507 rpm in a cylindrical gallon reaction flask equipped with baffles, a double pitched bladed stirrer, a thermocouple, and a condenser. The dispersion temperature after this addition was 45° C. The dispersion was stirred for 30 minutes while increasing the dispersion temperature to 50° C. Then, the dispersion temperature set point was lowered to 38° C. and 198.6 g of deionized water was added over 25 minutes. The dispersion was stirred for an additional 45 minutes, another 546.2 g of deionized water was added over 25 minutes and the final dispersion was stirred for an additional 45 minutes.

2655 g of the dispersion were transferred to a flask equipped with a stirrer, a thermocouple, a Friedrichs condenser, and a receiver flask. The dispersion was heated to 60° C. and the methyl isobutyl ketone and water removed by vacuum distillation. 118 g of deionized water was added to the dispersion.

The final dispersion had a solids content of 46.8 weight percent (measured for one hour at 110° C.), a Brookfield viscosity of 1440 centipoise using a #4 spindle at 12 rpm, an acid content of 0.124 meq acid/g, a base content of 0.125 meq base/g, a pH of 8.50, a residual methyl isobutyl ketone content of 0.18 weight percent, a number average particle size of 4260 angstroms and a volume average particle size of 4670 angstroms. Results were obtained using the same testing procedures described in Example 1.

Example 7

Preparation of Hydroxy and Blocked Isocyanate Polyurethane Using Dimethylolpropionic Acid (DMPA)

This example illustrates the preparation of a polyurethane material with both hydroxyl and blocked isocyanate functionality synthesized using dimethylolpropionic acid as the acid functionality for dispersion rather than trimellitic anhydride used in the above examples.

A reaction vessel equipped with a stirrer, a thermocouple, a condenser, and a nitrogen inlet was charged with 1697.0 g of isophorone diisocyanate, 484.8 g of methyl isobutyl ketone and 0.74 g of dibutyl tin dilaurate and heated to 45° C. 88.4 g of trimethylolpropane was added and the reaction was allowed to exotherm to 72° C. After cooling the reaction to 66° C., another 88.4 g of trimethylolpropane was added to the reaction flask. The temperature of the reaction product increased to 89° C. The reaction product was allowed to cool to 75° C. After one hour the isocyanate equivalent weight of the reaction was 207 grams per isocyanate equivalent.

938.7 g of TERATHANE® 650 was added over one hour followed by 142.5 g of methyl isobutyl ketone. After 30 minutes, the reaction's isocyanate equivalent weight was 403. Then, 293.9 g of methyl ethyl ketoxime was added over 30 minutes followed by 95.0 g of methyl isobutyl ketone, 166.3 g of dimethylolpropionic acid and 142.5 g of methyl isobutyl ketone. The reaction was stirred until the isocyanate equivalent weight was 1600 grams per equivalent.

1306.7 g of this isocyanate prepolymer were charged to a reaction vessel equipped with a stirrer, a thermocouple, a condenser, and a nitrogen inlet. With the vessel contents stirring at 500 rpm and at 70° C., 181.2 g of Jeffamine D-2000 was added over two minutes. After stirring an additional 15 minutes, 59.5 g of diethanol amine and 15.0 g of methyl isobutyl ketone were added. The temperature of the reaction product increased to 81° C. The reaction product was stirred until no evidence of isocyanate was observed by FTIR.

The resultant product an acid value of 14.2 mg KOH/g product, a hydroxyl value of 43.2 mg KOH/g product and a weight average molecular weight of 7237 g/mole.

Example 8

Preparation of Aqueous Dispersion of the Hydroxyl and Blocked Isocyanate Polyurethane of Example 7

1341.9 g of the polyurethane of Example 7 at 85° C. were added over 30 minutes to a solution of 623.0 g of deionized water and 21.2 g of dimethyl ethanol amine stirring at 21° C. and at 529 rpm in a cylindrical gallon reaction flask equipped with baffles, a double pitched bladed stirrer, a thermocouple, and a condenser. The dispersion temperature after this addition was 45° C. The dispersion was stirred for 30 minutes while increasing the dispersion temperature to 50° C. Then, the dispersion temperature set point was lowered to 38° C and 198.6 g of deionized water was added over 25 minutes. The dispersion was stirred for an additional 45 minutes, another 546.2 g of deionized water was added over 25 minutes and the dispersion stirred for another 45 minutes. Then an additional 390.1 g of deionized water was added over 25 minutes and the final dispersion stirred for another 45 minutes.

3040 g of the dispersion were transferred to a flask equipped with a stirrer, a thermocouple, a Friedrichs condenser, and a receiver flask. The dispersion was heated to 60° C. and the methyl isobutyl ketone and water removed by vacuum distillation. This initial dispersion was not stable, therefore additional dimethyl ethanol amine was added to increase the percent neutralization to 80 percent.

The final dispersion had a solids content of 36.3 weight percent (measured for one hour at 110° C.), a Brookfield viscosity of 12,000 centipoise using a #3 spindle at 6 rpm, an acid content of 0.112 meq acid/g, a base content of 0.093 meq base/g, a residual methyl isobutyl ketone content of 0.57 weight percent, a number average particle size of 1143 angstroms and a volume average particle size of 1327 angstroms. Results were obtained using the same testing procedures described in Example 1.

Coating compositions were prepared using the aqueous dispersions of the above Examples. First, a pigment paste was prepared as follows:

Example 9

Preparation of Pigment Paste Using Polyurethane Material of Example 2

A black pigment paste was prepared from the following ingredients:

| ITEM # | COMPONENT | Weight in grams |
|---|---|---|
| 1 | Example #2 Polyurethane Material | 579.1 |
| 2 | Nonionic Surfactant[1] | 37.0 |
| 3 | Deionized Water | 50.0 |
| 4 | Carbon Black[2] | 65.0 |
| 5 | Barytes[3] | 915.0 |
| 6 | Titanium Dioxide[4] | 20.0 |
| 7 | Deionized Water | 42.0 |
| | TOTALS | 1708.1 |

[1]Byk 191, available from Byk-Chemie USA Inc, Wallington, Connecticut.
[2]PRINTEX-G, available from DeGussa-Huls Corporation, Ridgefield Park, New Jersey.
[3]available from Sachtleben Chemie GmBH.
[4]available from DuPont de Nemours Company, Wilmington, Delaware.

The first three ingredients were stirred together in the given order. The pigments (Items 4, 5 and 6) were added in small portions while stirring until a smooth paste was formed. The paste was then recirculated for 20 minutes through an Eiger Minimill at 2500 rpm with 2 mm zircoa beads. The final product had a Hegman rating of 7.5+.

Example 10

Primer Coating Composition Using Polyurethane of Example 2

A primer coating composition was made by mixing in order the following ingredients:

| ITEM # | COMPONENT | Weight in grams |
|---|---|---|
| 1 | Example #9 pigment paste | 341.6 |
| 2 | Example #2 polyurethane material | 1538.8 |
| 3 | Deionized Water | 75.0 |
| | TOTALS | 1955.4 |

The pH of the coating was greater than 8.0. The viscosity was 30 seconds as measured on a #4 Ford efflux cup at ambient temperature.

The primer coating composition of this example (Sample A) was evaluated against a solventborne primer/surfacer (commercially available from PPG Industries Lacke GmbH as PPG-73277) (Comparative Sample). The test substrates were ACT cold roll steel panels electrocoated with a cationically electrodepositable primer commercially available from PPG Industries, Inc. as ED-5000, which are commercially available from ACT Laboratories of Hillsdale, Mich. Both the primer coating composition of the present invention and the commercial primer/surfacer were spray applied (2 coats automated spray with 60 seconds ambient flash between coats) at 60% relative humidity and 21° C. to give a dry film thickness of 1.35 to 1.45 mils (33 microns to 36 microns). The panels were flashed for 10 minutes at the ambient condition, and were then baked for 10 minutes at 80° C. and then 30 minutes at 165° C. The panels were topcoated with a silver basecoat and flashed for 5 minutes at the ambient conditions, and baked for 10 minutes at 80° C. to give a film thickness of 0.55 to 0.65 mils. The basecoat formulation used is sold under the tradename HWB519F, commercially available from PPG Industries, Inc., Pittsburgh, Pa.

The panels were then clearcoated with a 2K clearcoat (commercially available from PPG Industries Cleveland as Part A TKV1050AR/Part B WTKR2000B) and flashed for 10 minutes at ambient condition and then baked for 30 minutes at 165° C. The thickness of the clearcoat was determined to be 1.8 mils (40 microns).

The appearance and physical properties of the coated panels were measured using the following tests: Chip resistance (multichip) was measured by the Erichsen chip method (PPG STM-0802 or Ford Test Method #BI 157-06, without steps 3 and 4, 2×2000 g, 30 psi) with a rating of zero being best. Multichip by the GM Gravelometer (PPG STM-0744, or GM Test Method #GME 60-268, −20° C.) with a rating scale of 0–10 with 10 being the best. Monochip testing on the BYK-Gardner Monochip Tester (PPG STM-0823, or BMW Test Method BMW-PA15-163L, RT and −20° C.) with a rating of mm of pick-off from the point of impact. By "pick-off" what is meant is the amount of delamination pulled from the sample by an adhesive. The test results are set forth below in Table 1.

TABLE 1

|  | GM Gravelometer | | | | | |
|---|---|---|---|---|---|---|
|  | Rating | | Chips to metal | | | Monochip |
| Primer | RT | −20° C. | RT | −20° C. | Erichson 1 × 2000 | RT | −20° C. |
| Comparative | 9 | 2 | 2 | 5 | 2.5 | 3 (M) | 3 (M) |
| Sample A | 8 | 8 | 1 | 3 | 1.0 | <1 (NF) | 2.5 (M) |

NF = No Failure
M = Failure to Metal

As shown in Table 1, the substrate coated with the primer of the present invention (Sample A) exhibited generally better chip resistance than the comparative solventborne commercially available primer surfacer (Comparative Sample).

Appearance was also measured on the finished panels. Appearance was measured using the BYK-wavescan (commercially available from BYK-Gardner, Columbia, Md.) with data collected on the longwave and shortwave numbers. The instrument optically scans the wavy, light dark pattern on the surface over a distance of 10 cm (4 in) and detects the reflected light intensity point by point. The measured optical profile is divided into long-term waviness (structure size 0.6–10 mm) and short-term waviness (structure size 0.1–0.6 mm). Wavy structures with sizes between 0.1 mm and 10 mm are considered as orange peel or microwaviness. Orange peel is observed as a wavy, light-dark pattern on a high gloss surface. The type of structures that can be seen is dependent on the observation distance: long-term waviness at distances of 2 to 3 m and short-term waviness at about 50 cm (original adhesion, using ASTM # D3359-97). Adhesion was tested by making a crosshatch grid and applying tape (Scotch 610) over the grid. The tape is then pulled from the grid and examined for delamination. These results are listed in Table 2.

TABLE 2

| Sample | BYK-wavescan Shortwave | BYK-wavescan Longwave | X-hatch Adhesion |
|---|---|---|---|
| Comparative | 21.7 | 3.6 | Pass |
| Sample A | 26.0 | 5.1 | Pass |

The crosshatch samples were then put into a humidity chamber (38° C., 100 percent relative humidity) for ten days (Chrysler Humidity Box) and tested again for adhesion in the same manner listed above. Both samples still past this test (i.e. there was no loss of adhesion).

Example 10 (Sample A) was also applied via automated spray as described above, to precoated line steel (USS Galvaneal) coated with about 3–4 micrometers of Bonazinc 3001 zinc-rich epoxy pretreatment, which is commercially available from PPG Industries, Inc., Pittsburgh, Pa. This substrate was not electrocoated. The same basecoat and clearcoat described above were applied in a similar manner. The panels were tested along with the previously reported samples and in the same manner. The results set forth in Table 3 were observed:

TABLE 3

| Primer | BYK Wavescan | | Erichson | Monochip | |
|---|---|---|---|---|---|
|  | Longwave | Shortwave | 2 × 2000 | R.T. | −20 |
| Sample A Over Steel Coated with BONAZINC 3001 | 12.8 | 35.1 | 1.0 | <1 (NF) | 1 (NF) |

Example 11

Primer Coating Composition Including Polyurethane of Example 8

A primer coating composition was made by mixing in order the following ingredients:

| ITEM # | COMPONENT | Weight in Grams |
|---|---|---|
| 1 | Deionized Water | 10.7 |
| 2 | Ethylene Glycol Monobutyl Ether[5] | 1.9 |
| 3 | Nonionic Surfactant[1] | 0.6 |
| 4 | Defoamer[6] | 0.2 |
| 5 | Carbon Black[2] | 1.3 |
| 6 | Magnesium Silicate[7] | 2.5 |
| 7 | Silicon Dioxide[8] | 0.3 |
| 8 | Barium Sulfate[9] | 15.5 |
| 9 | Titanium Dioxide[4] | 0.4 |
| 10 | Example #8 Polyurethane Material | 275.5 |
| 11 | Deionized Water | 25.0 |
|  | TOTALS | 333.9 |

[5]Butyl Cellusolve, commercially available from The British Petroleum Company, London, England.
[6]Byk 191, commercially available from Byk-Chemie USA Inc, Wallington, Connecticut.
[7]Talc, commercially available from Norweigian Talc, Norway
[8]Silica, commercially available from DeGussa-Huls Corporation, Ridgefield Park New Jersey.
[9]commercially available from Sachtleben Chemie GmBH.

The first four ingredients were stirred together in the given order. The pigments (Items 5–9) were added in small portions while stirring until a smooth paste was formed. The paste was then recirculated for twenty minutes through an Eiger Minimill at 2500 rpm with 2 mm zircoa beads. The final product had a Hegman rating of 7.5+. The composition of Example 8 and deionized water were added to the product in the amounts identified above and stirred. Final viscosity of the material was 31 seconds measured using a #4 Ford efflux cup at ambient temperature. The pH of the material was measured to be greater than 8.0.

Both of the primer coating compositions of Example 10 and Example 11 were spray applied (2 coats automated spray with 60 seconds ambient flash between coats) at 60% relative humidity and 21° C. over Tedlar™, a polyvinyl fluoride film available from DuPont de Nemours Company, Wilmington, Del., (taped to a steel panel and baked at 320° F. for 20 minutes) to give a dry film having a thickness of 1.35 to 1.45 mils. The panels were flashed for 10 minutes at the ambient condition, and were then baked for 10 minutes at 80° C. and 30 minutes at 165° C.

The two primer examples were then tested for determination of physical properties. Free films peeled from the coated Tedlar substrate were cut into ½×4" test strips and were tested for Young's Modulus, tensile strength, percent elongation, and toughness using an Instron Mini 44, using a 1" gauge length and a crosshead speed of 25.4 mm/minute (according to TOUGHNESS TEST METHOD at 25° C.). Results are listed in Table 4.

TABLE 4

| Sample ID | Young's Modulus (MPa) | Tensile Strength (MPa) | % Elongation | Toughness (MPa) |
|---|---|---|---|---|
| Example #10 | 662 | 26 | 156 | 22 |
| Example #11 | 842 | 31 | 8 | 2 |

Comparing the results of the anionic polyurethane primer coating of the present invention with the commercial primer coating indicates that the coatings of the present invention can display better Young's Modulus, tensile strength, percent elongation, and toughness than the commercially available coatings.

Coatings including the polyurethane materials of the present invention can provide primer and other coating compositions having one or more desirable properties, such as chip resistance.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. An anionic self-crosslinkable polyurethane material having hydroxyl functionality, the polyurethane material having a weight average molecular weight of less than 15,000 grams per mole, and having a combined urethane/urea equivalent weight ranging from about 200 to about 400 grams per equivalent, wherein the polyurethane material, when cured, has a toughness of at least 20 MPa according to TOUGHNESS TEST METHOD at a temperature of 25° C.

2. The polyurethane material of claim 1, wherein the polyurethane material has a weight average molecular weight ranging from about 3,000 to about 10,000 grams per mole.

3. The polyurethane material of claim 2, wherein the polyurethane material has a weight average molecular weight ranging from about 4,000 to about 8,000 grams per mole.

4. The polyurethane material of claim 1, wherein the polyurethane material has a combined urethane/urea equivalent weight ranging from about 220 to about 320 grams of film per urethane group equivalent.

5. The polyurethane material of claim 1, wherein the polyurethane material, when cured, has a toughness ranging from about 20 to about 60 MPa according to TOUGHNESS TEST METHOD at a temperature of 25° C.

6. The polyurethane material of claim 5, wherein the polyurethane material, when cured, has a toughness ranging from about 20 to about 50 MPa according to TOUGHNESS TEST METHOD at a temperature of 25° C.

7. The polyurethane material of claim 1, wherein the polyurethane material comprises isocyanate functional groups, the isocyanate functional groups blocked with a blocking agent.

8. The polyurethane material of claim 7, wherein the blocking agent is capable of deblocking from the isocyanate functional groups at a temperature ranging from about 90 to about 180° C.

9. The polyurethane material of claim 8, wherein the blocking agent is capable of deblocking from the isocyanate functional groups at a temperature of less than about 160° C.

10. The polyurethane material of claim 1, wherein the polyurethane material is present in an aqueous composition in amount ranging from about 10 to about 60 percent by weight based upon the total weight of the aqueous composition.

11. The polyurethane material of claim 10, wherein the polyurethane material is present in the aqueous composition in amount ranging from about 40 to about 55 percent by weight based upon the total weight of the aqueous composition.

12. The polyurethane material of claim 1, wherein the polyurethane material, when dispersed in an aqueous medium, is anionic and contains salt groups.

13. An anionic self-crosslinkable polyurethane material having hydroxyl functionality, the polyurethane material having a weight average molecular weight of less than 15,000 grams per mole, wherein the polyurethane material, when cured, has a toughness of at least 20 MPa according to TOUGHNESS TEST METHOD at a temperature of 25° C. and wherein the polyurethane material is formed from components comprising:
  (a) at least one polyisocyanate;
  (b) at least one active hydrogen-containing material;
  (c) at least one material having at least one primary or secondary amino group and at least one hydroxyl group; and
  (d) at least one acid functional material or anhydride having a functional group reactive with isocyanate or hydroxyl groups of other components from which the polyurethane material is formed.

14. The polyurethane material of claim 13, wherein the polyisocyanate is selected from the group consisting of aliphatic polyisocyanates, cycloaliphatic polyisocyanates, araliphatic polyisocyanate, and aromatic polyisocyanates, and mixtures thereof.

15. The polyurethane material of claim 14, wherein the polyisocyanate is selected from the group consisting of isophorone diisocyanate, tetramethyl xylylene diisocyanate, trimethylhexamethylene diisocyanate, hexamethylene diisocyanate, and mixtures thereof.

16. The polyurethane material of claim 15, wherein the polyisocyanate is isophorone diisocyanate.

17. The polyurethane material of claim 13, wherein the polyisocyanate is present in an amount ranging from about 10 to about 60 weight percent based upon the total resin solids of components from which the curable polyurethane material is formed.

18. The polyurethane material of claim 13, wherein the active hydrogen-containing material is a polyol.

19. The polyurethane material of claim 18, wherein the polyol has a weight average molecular weight of less than about 3000 grams per mole.

20. The polyurethane material of claim 19, wherein the polyol has a weight average molecular weight of at least about 60 grams per mole.

21. The polyurethane material of claim 20, wherein the polyol is selected from the group consisting of trimethylolpropane, ditrimethylolpropane, pentaerythritol, trimethylolethane, and mixtures thereof.

22. The polyurethane material of claim 21, wherein the polyol is trimethylolpropane.

23. The polyurethane material of claim 18, wherein the polyol is present in an amount ranging from about 2 to about 50 weight percent based upon the total resin solids of components from which the curable polyurethane material is formed.

24. The polyurethane material of claim 13, wherein the polyisocyanate and the active hydrogen-containing material are pre-reacted to form a polyisocyanate functional prepolymer prior to addition of remaining components (c)–(d) used to form the polyurethane material.

25. The polyurethane material of claim 13, further comprising a polyoxyalkylene polyamine that is a material different from the active hydrogen-containing material.

26. The polyurethane material of claim 13, further comprising a polyoxyalkylene polyamine that is selected from the group consisting of polyoxypropylene diamine, polytetramethylene glycol bis(3-aminopropyl(ether)), and mixtures thereof.

27. The polyurethane material of claim 26, wherein the polyoxyalkylene polyamine is polyoxypropylene diamine.

28. The polyurethane material of claim 26, wherein the polyoxyalkylene polyamine Is present in an amount ranging from about 1 to about 50 weight percent based upon the total resin solids of components from which the curable polyurethane material is formed.

29. The polyurethane material of claim 13, wherein component (c) is selected from the group consisting of diethanol amine, 2-amino-2-methylpropanediol, diisopropanolamine, and mixtures thereof.

30. The polyurethane material of claim 29, wherein component (c) is diethanol amine.

31. The polyurethane material of claim 13, wherein component (c) present in an amount ranging from about 2 to about 20 weight percent based upon the total resin solids of components from which the curable polyurethane material is formed.

32. The polyurethane material of claim 13, wherein component (d) is an organic compound having an acid anhydride group.

33. The polyurethane material of claim 13, wherein component (d) is selected from the group consisting of hydroxy pivalic acid and trimellitic anhydride.

34. The polyurethane material of claim 13, wherein component (d) is present in an amount of at least 2 weight percent based upon the total resin solids of components from which the curable polyurethane material is formed.

35. The polyurethane material of claim 13, wherein the components from which the polyurethane material is formed further comprises at least one polyoxyalkylene polyol.

36. The polyurethane material of claim 35, wherein the polyoxyalkylene polyol is selected from the group consisting of polyoxyethylene polyols and polyoxypropylene polyols.

37. The polyurethane material of claim 35, wherein the polyoxyalkylene polyol is polyoxytetramethylene polyol.

38. The polyurethane material of claim 35, wherein the polyoxyalkylene polyol has a weight average molecular weight of less than about 3000 grams per mole.

39. The polyurethane material of claim 13, wherein the components from which the polyurethane material is formed further comprise a blocking agent.

40. The polyurethane material of claim 39, wherein the blocking agent is selected from the group consisting of methyl ethyl ketoxime, dimethyl pyrazole, epsilon-caprolactam, diisopropylamine, dibutylamine, di-tert-butylamine, and mixtures thereof.

41. The polyurethane material of claim 40, wherein the blocking agent is selected from the group consisting of methyl ethyl ketoxime, dimethyl pyrazole, and diisopropylamine.

42. The polyurethane material of claim 13, wherein the components from which the polyurethane material is formed further comprise an organic solvent.

43. The polyurethane material of claim 13, wherein the components from which the polyurethane material is formed further comprise a tertiary amine.

44. The polyurethane material of claim 43, wherein the tertiary amine is dimethylethanol amine.

45. A powder coating composition comprising an anionic self-crosslinkable curable polyurethane material having hydroxyl functionality, the polyurethane material having a weight average molecular weight of less than 15,000 grams per mole wherein the polyurethane material, when cured, has a toughness of at least 20 MPa according to TOUGHNESS TEST METHOD at a temperature of 25° C.

46. An aqueous slurry coating composition comprising the curable polyurethane material of claim 1.

47. A primer coating composition comprising the curable polyurethane material of claim 1.

48. A primer coating composition comprising an anionic self-crosslinkable curable polyurethane material having hydroxyl functionality, the polyurethane material having a weight average molecular weight of less than 15,000 grams per mole wherein the polyurethane material, when cured, has a toughness of at least 20 MPa according to TOUGHNESS TEST METHOD at a temperature of 25° C.; and a curing agent that is reactive with the curable groups of the polyurethane material.

49. The primer coating composition of claim 48, wherein the polyurethane material is present in the primer in an amount ranging from about 20 to about 100 weight percent based upon the total resin solids of components from which the primer is formed.

50. A basecoat composition comprising the curable polyurethane material of claim 1.

51. A clear coating composition comprising the curable polyurethane material of claim 1.

52. A monocoat composition comprising the curable polyurethane material of claim 1.

53. A multicomponent composite coating comprising a basecoat deposited from a pigmented coating composition and a clearcoat applied over the basecoat in which the clearcoat is deposited from a clearcoating composition, wherein at least one of the basecoat composition and the clearcoating composition comprise the curable polyurethane material of claim 1.

54. A multicomponent composite coating comprising a primer deposited from a primer coating composition and a topcoat applied over the primer in which the topcoat is deposited, wherein at least one of the primer composition and the topcoat composition comprise the curable polyurethane material of claim 1.

55. A coated substrate having coated layers applied thereover, at least one of the layers comprising the curable polyurethane material of claim 1.

56. An anionic self-crosslinkable polyurethane material having hydroxyl functionality, the polyurethane material having a weight average molecular weight of less than 15,000 grams per mole, and having a combined urethane/urea equivalent weight ranging from about 200 to about 400 grams per equivalent, wherein the polyurethane material, when cured, has a toughness of at least 20 MPa according to TOUGHNESS TEST METHOD at a temperature of 25° C., the polyurethane material comprising isocyanate functional groups, the isocyanate functional groups blocked with a blocking agent.

57. The polyurethane material of claim 56, wherein the blocking agent is capable of deblocking from the isocyanate functional groups at a temperature ranging from about 90 to about 180° C.

58. A primer composition comprising an anionic self-crosslinkable polyurethane material having hydroxyl functionality, the polyurethane material having a weight average molecular weight of less than 15,000 grams per mole, and having a combined urethane/urea equivalent weight ranging from about 200 to about 400 grams per equivalent, wherein the polyurethane material, when cured, has a toughness of at least 20 MPa according to TOUGHNESS TEST METHOD at a temperature of 25° C.

59. A process for forming an aqueous composition comprising an anionic self-crosslinkable polyurethane material, the process comprising:

(a) forming the polyurethane material, the polyurethane material having hydroxyl functionality, and having a combined urethane/urea equivalent weight ranging from about 200 to about 400 grams per equivalent, and having a weight average molecular weight of less than 15,000 grams per mole, wherein the polyurethane material, when cured, has a toughness of at least 20 MPa according to TOUGHNESS TEST METHOD at a temperature of 25° C.; and (b) dispersing the polyurethane material in water to form an aqueous composition.

60. A process for preparing a coated substrate, comprising, (a) forming a coating on the substrate, the coating being a composition comprising an anionic self-crosslinkable polyurethane material having hydroxyl functionality, the polyurethane material having a weight average molecular weight of less than 15,000 grams per mole, and having a combined urethane/urea equivalent weight ranging from about 200 to about 400 grams per equivalent, wherein the polyurethane material, when cured, has a toughness of at least 20 MPa according to TOUGHNESS TEST METHOD at a temperature of 25° C.; and (b) at least partially curing the coating.

* * * * *